(12) United States Patent
Stewart et al.

(10) Patent No.: US 9,946,459 B2
(45) Date of Patent: Apr. 17, 2018

(54) SYSTEMS AND METHODS FOR DETERMINING INTENTIONAL TOUCH SCREEN CONTACT

(75) Inventors: Aaron M. Stewart, Raleigh, NC (US); Harriss Christopher Neil Ganey, Cary, NC (US); Jay W. Johnson, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 851 days.

(21) Appl. No.: 12/789,491

(22) Filed: May 28, 2010

(65) Prior Publication Data

US 2011/0291948 A1 Dec. 1, 2011

(51) Int. Cl.
*G06F 3/041* (2006.01)
*G06F 3/0489* (2013.01)
*G06F 3/0488* (2013.01)

(52) U.S. Cl.
CPC ........ *G06F 3/0489* (2013.01); *G06F 3/04886* (2013.01)

(58) Field of Classification Search
CPC ........................... G06F 3/0489; G06F 3/04886
USPC .................................................. 345/173–178
See application file for complete search history.

(56) References Cited

U.S. PATENT DOCUMENTS

| | | | |
|---|---|---|---|
| 2004/0119744 A1* | 6/2004 | Chan ................... | G06F 3/04812 715/763 |
| 2004/0150631 A1* | 8/2004 | Fleck .................. | G06F 3/03545 345/179 |
| 2006/0109252 A1 | 5/2006 | Kolmykov-Zotov | |
| 2007/0152976 A1* | 7/2007 | Townsend et al. ........... | 345/173 |
| 2008/0040692 A1* | 2/2008 | Sunday ............... | G06F 3/04883 715/863 |
| 2010/0146459 A1* | 6/2010 | Repka ........................... | 715/863 |
| 2011/0050576 A1* | 3/2011 | Forutanpour et al. ........ | 345/168 |
| 2011/0084914 A1* | 4/2011 | Zalewski ....................... | 345/173 |
| 2016/0291794 A1* | 10/2016 | Kawamura ........... | G06F 3/0485 |

FOREIGN PATENT DOCUMENTS

| | | |
|---|---|---|
| CN | 1797305 | 7/2006 |
| CN | 101482785 A | 7/2009 |
| TW | 200844819 A | 11/2008 |
| TW | 201018181 A | 5/2010 |

* cited by examiner

*Primary Examiner* — Christopher E Leiby
(74) *Attorney, Agent, or Firm* — Ference & Associates LLC

(57) ABSTRACT

A device configured to distinguish between intentional and inadvertent input is provided. Input may be in the form of touch screen or on-screen keyboard input. Such input is examined such that a device may ignore unintentional and resting contact while reacting only to purposeful contact. The characteristics of unintentional and resting device contact are ascertained and differentiated from the contact characteristics of intentional device input.

20 Claims, 3 Drawing Sheets

SYSTEMS AND METHODS FOR DETERMINING INTENTIONAL TOUCH SCREEN CONTACT

BACKGROUND

The subject matter presented herein generally relates to distinguishing intentional from inadvertent device input. More specifically, the subject matter herein relates to differentiating between the characteristics of inadvertent and resting contact with that of purposeful contact in order to activate a touch screen only when the user intentionally presses an area on the touch screen.

The use of touch screens and on-screen keyboards has grown substantially. Today, such technology is present in a wide array of devices, such as cellular phones, tablet computers, audio-visual devices, and interactive kiosk systems. In addition, touch screens have the ability to determine the location and the size of screen contact. For example, certain touch screen technology uses a grid of cells and can sense which cells are being touched at any given point in time. Other touch screens may measure the number of contacted pixels or the physical contact area size, such as the number of millimeters. Another method for determining the area of touch screen contact involves the use of an x-y coordinate system which equates coordinates to pixels or a physical measurement, such as millimeters. Thus, existing touch screen and on-screen keyboard technology is not only able to detect user contact, but may be able to detect the surface area and location of such contact.

As use of touch screens and on-screen keyboards has increased, so have user expectations of the technology. Although touch screens and on-screen keyboards are extremely useful, their use can also be problematic because they are susceptible to activation due to inadvertent contact. Unlike traditional mechanical keyboards with physical buttons or keys, a touch screen or the keys of an on-screen keyboard offer no inherent resistance to activation. As a result, they are much more responsive to unintentional and inadvertent contact. In addition, the resistance force of the key mechanisms on a traditional mechanical keyboard allow the fingers to rest on the keyboard without activating the keys. However, current touch screen and on-screen keyboard technology does not adequately provide similar functionality such that a user may rest their fingers on an on-screen keyboard without generating inadvertent key events.

Existing touch screen and on-screen keyboard technology mainly responds to signal breaks to determine whether an active area has been pressed. As such, inadvertent virtual button and key presses occur easily and frequently. Other touch screen solutions attempt to utilize the size of the contact area to distinguish between, for example, hand and finger contact. However, such solutions are only able to crudely distinguish between large differences in keyboard contact characteristics. Thus, existing solutions are not able to differentiate more precise contact variances, such as that between a finger at rest on an on-screen keyboard and a finger actively pressing a key.

BRIEF SUMMARY

In summary, one aspect of the invention provides an apparatus comprising: one or more input devices; and one or more processors; wherein, responsive to execution of computer readable program code accessible to the one or more processors, the one or more processors are configured to: receive input via the one or more input devices; ascertain one or more input characteristics of the received input; and distinguish the input as one of inadvertent contact and intentional contact based on the one or more input characteristics; wherein the one or more input characteristics comprise one or more of area, shape, and direction Another aspect provides a method comprising: receiving input via one or more input devices; ascertaining one or more input characteristics of the received input; and distinguishing the input as one of inadvertent contact and intentional contact based on the one or more input characteristics; wherein the one or more input characteristics comprise one or more of area, shape, and direction.

A further aspect provides a computer program product comprising: a computer readable storage medium having computer readable program code embodied therewith, the computer readable program code comprising: computer readable program code configured to receive input via one or more input devices; computer readable program code configured to ascertain one or more input characteristics of the received input; and computer readable program code configured to distinguish the input as one of inadvertent contact and intentional contact based on the one or more input characteristics; wherein the one or more input characteristics comprise one of more of area, shape, and direction.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1B:
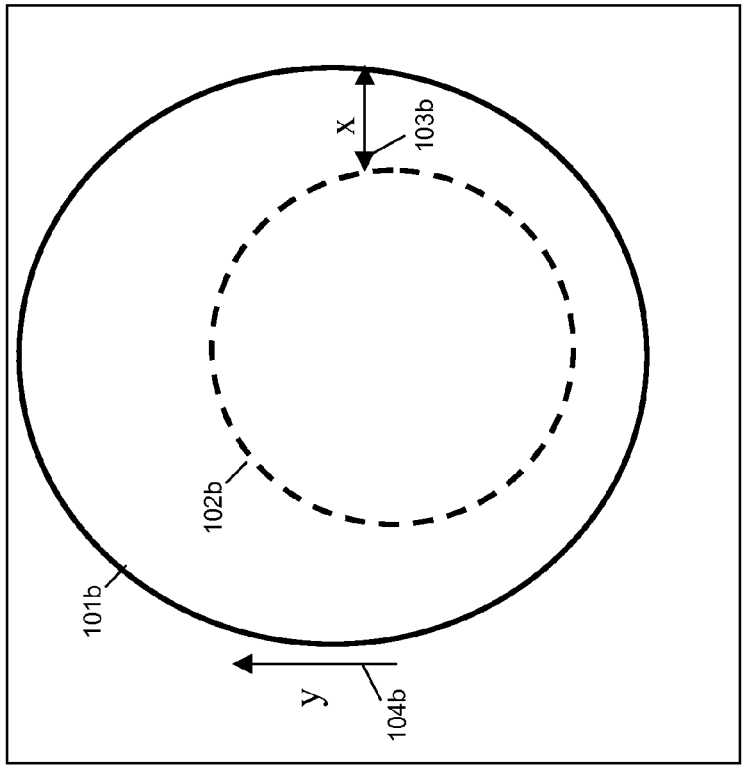
FIG. 1B illustrates another example of touch screen input.

It will be readily understood that the components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the claims, but is merely representative of those example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

As discussed herein, existing touch screen technology is inadequate to address unintentional touch screen activation. One reason is that existing touch screens simply react to signal breaks and, as such, do not directly address inadvertent touch screen contact. Another reason is that solutions that attempt to address inadvertent activation are only able to differentiate between large differences in screen contact characteristics, such as the difference between contact by a hand as compared to contact by a finger.

Accordingly, the inventors have recognized a need for improved techniques for differentiating between inadvertent and intentional touch screen and on-screen keyboard contact. This is particularly true for differentiating precise differences between different types of contact. The need for such improved techniques is especially true for devices requiring heavy use of touch screen and on-screen keyboard input. For instance, when entering text using the on-screen keyboard or the stylus of a tablet computer, such as that available with the ThinkPad® X200 Tablet, which are sold by Lenovo (US) Inc. of Morrisville.

Accordingly, embodiments provide systems, methods, apparatuses and computer program products configured to distinguish between intentional and inadvertent device input. Embodiments provide touch screens or on-screen keyboards configured to ignore unintentional and resting contact while reacting only to purposeful contact. Embodiments provide for determining the characteristics of unintentional and resting contact, and differentiating these characteristics from the contact characteristics when a user is intentionally pressing a touch screen area. Embodiments further provide touch screens and on-screen keyboards that dynamically learn screen contact characteristics.

The illustrated embodiments will be best understood by reference to the figures. The following description is intended only by way of example, and simply illustrates certain example embodiments.

Figure 1A:
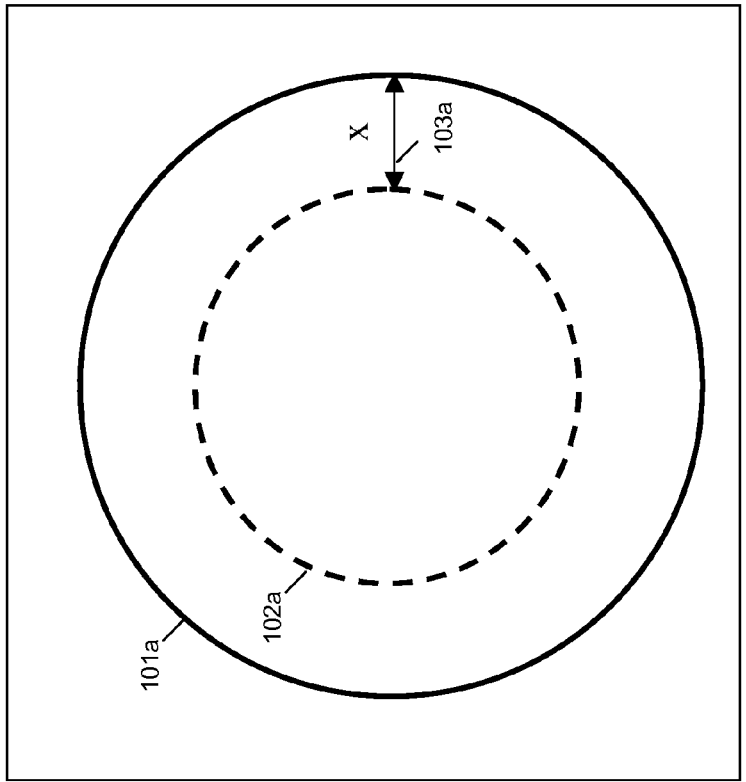
FIG. 1A illustrates an example of touch screen input.

Referring now to FIG. 1A, therein is a depiction of a finger pressing a key on an on-screen keyboard, which serves as a non-limiting example to explain the general concepts underlying embodiments of the invention. A finger resting on or unintentionally contacting an on-screen keyboard has a particular contact area with the keyboard 102a. When a user presses the finger down on the keyboard to intentionally select a key, the finger tissue compresses and spreads out thereby enlarging the contact area 101a. Thus, there is a particular value 103a representing the difference in contact area between resting or unintentional contact 102a and intentional pressing contact 101a. Embodiments of the invention may detect the differential change between the resting contact area 102a and the pressing contact area 103a and, if the change in area is within a predetermined threshold, determine that intentional touch screen contact has occurred.

Embodiments of the invention provide that the predetermined threshold 103a may be a variably set percentage of how much larger the pressed contact area 101a is than resting contact area 102a. Embodiments provide that the predetermined threshold may range from zero to the width or height of the key area of an on-screen keyboard. Screen contact according to embodiments of the invention involves contact that has certain characteristics when the contact is inadvertent or resting contact and certain other characteristics when the contact is intentional. Embodiments provide that screen contact is performed by a mechanical input device, including, but not limited to, a stylus.

Figure 2B:
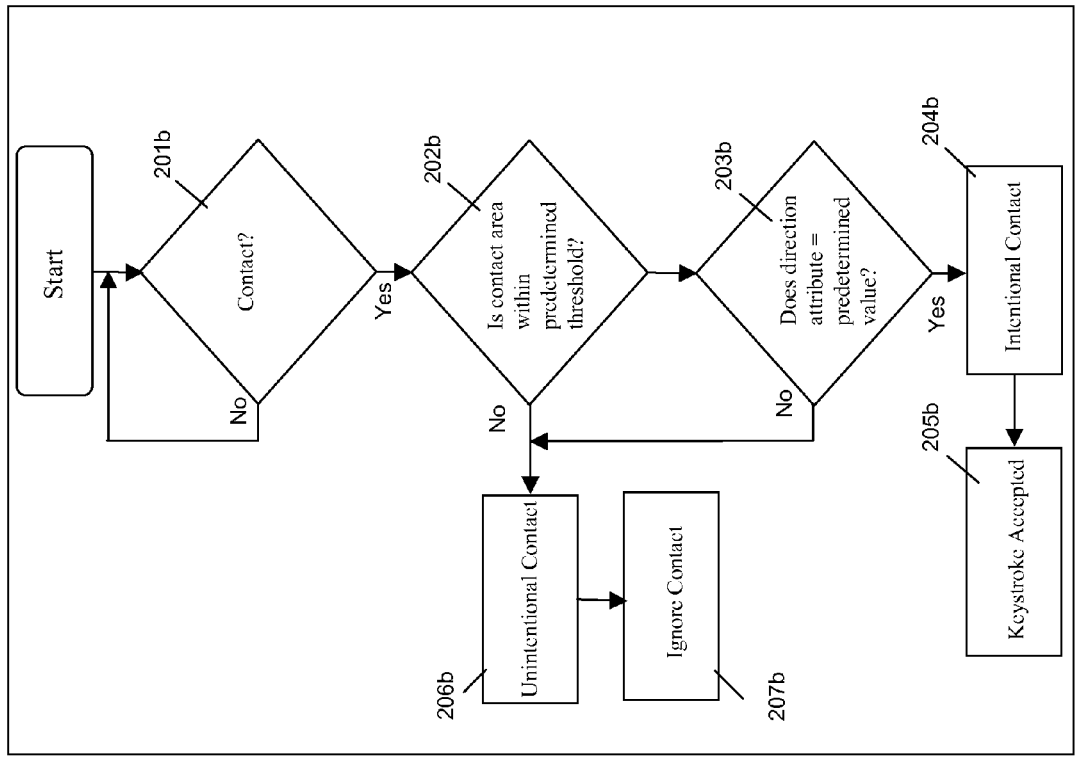
FIG. 2B provides a flow chart of another example method for examining contact.
Figure 2A:
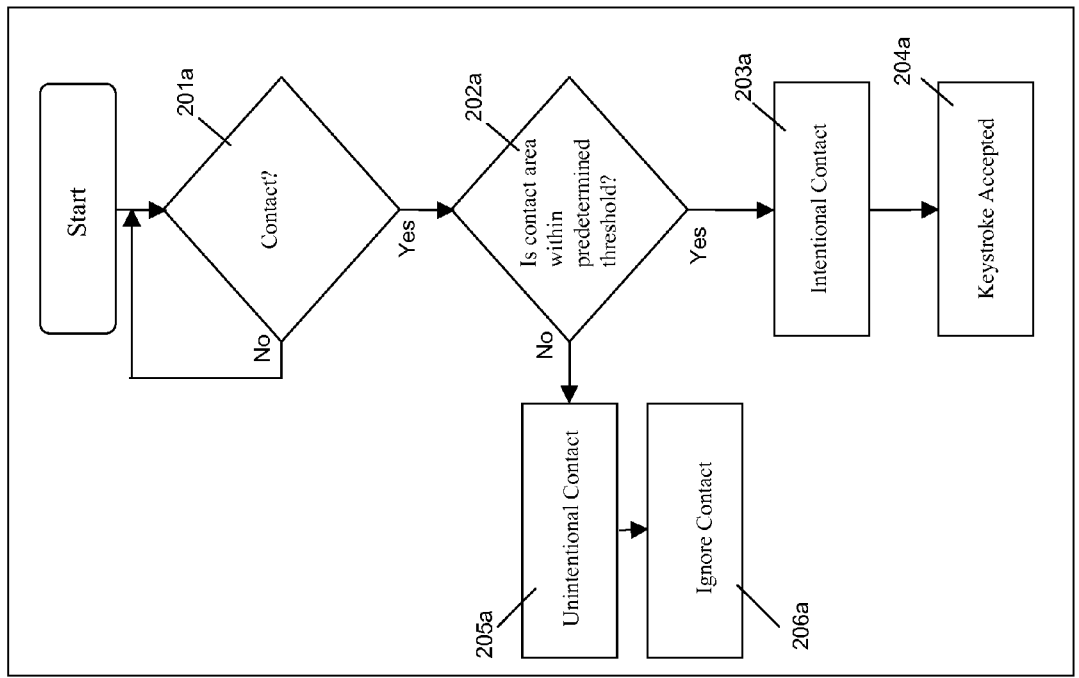
FIG. 2A provides a flow chart of an example method for examining contact.

FIG. 2A provides a diagram of an exemplary method according to the illustration provided in FIG. 1A, utilizing an on-screen keyboard as a non-limiting example representative of embodiments of the invention. When keyboard contact is made 201a, it is determined whether the contact area is within a predetermined threshold 202a. If it is within the threshold, then the contact is deemed intentional 203a and the keystroke is accepted 204a. If the contact area is not within the threshold, then the contact is deemed unintentional 205a and the contact is ignored 206a.

Referring now to FIG. 1B, therein is illustrated an intentional key press on an on-screen keyboard with a directional component. Embodiments of the invention utilize other contact characteristics besides the increase in contact surface area that occurs when a user intentionally selects a key on an on-screen keyboard, as was depicted in FIG. 1A. Certain embodiments are configured to detect changes in the directional attribute of screen contact. A finger resting on or unintentionally contacting an on-screen keyboard has a particular contact area with the keyboard 102b. As a non-limiting example representative of embodiments of the invention, when a user presses a key on an on-screen keyboard, the contact surface area 101b may increase 103b and may also move in a particular direction 104b. Embodiments of the invention are configured to examine the direction attribute 104b to determine whether intentional contact has occurred. Certain other embodiments provide for the examination of both the change in contact surface area 103b and the direction attribute 104b to ascertain whether screen contact was intentional or not. Further embodiments of the invention may examine whether the change in the direction attribute matches a predetermined change in direction value in order to discern whether contact is inadvertent or intentional.

FIG. 2B provides a diagram of an exemplary method according to the illustration provided in FIG. 1B, utilizing an on-screen keyboard as a non-limiting example representative of embodiments of the invention. When keyboard contact is made 201b, it is determined whether the contact area is within a predetermined threshold 202b. If the contact area is not within the threshold, then the contact is deemed unintentional 206b and the contact is ignored 207b. If it is within the threshold, then it is determined whether the direction attribute equals the predetermined value 203b. As a non-limiting example, the predetermined value could be motion in an upward direction. Thus, if the motion is in the unexpected downward direction, the contact will be suspect and may be deemed unintentional. As illustrated in FIG. 2B, if the contact is within the threshold value 202b and equals the predetermined value 203b, then the contact is deemed intentional 204b and the keystroke is accepted 205b. However, if the contact is within the threshold value 202b and does not equal the predetermined direction value 203b, then the contact is deemed unintentional 206b and is ignored 207b.

Resting and pressed contact areas are likely to be asymmetrical, non-uniform circles. Accordingly, embodiments of the invention provide for tolerance and flexibility when detecting contact growth, such that contact growth in all directions is not required. As a non-limiting example representative of embodiments of the invention, when a user presses a touch screen virtual button or an on-screen keyboard key, the contact area may grow more in the upper portion of the contact area and not at all or very little in the lower portion of the contact area. In addition, as another non-limiting example representative of embodiments of the invention, when a user typing on an on-screen traditional QWERTY keyboard presses a key in a row above the home row (the row of keys beginning with ASDF), the contact direction may be more likely to be in the upward direction, while when pressing a key below the home row, the contact direction may be more likely to be in the downward direction. Accordingly, embodiments of the invention may utilize directional information and tendencies to determine whether screen contact is inadvertent or intentional. Embodiments provide that the direction of contact growth can be prioritized such that contact growth is mapped to the trajectory of the key press.

In certain embodiments, the shape of the contact area or the change in shape of the contact area may be an indicator of contact change utilized to determine whether screen contact is inadvertent or intentional. According to embodiments of the invention, certain contact area shapes may be more indicative of purposeful contact. As a non-limiting example illustrative of embodiments of the invention, if the contact area is more oval shaped than circle shaped, or if the resting contact area changes from a roughly circular shape to more of an oblong shape, the screen contact may be more likely to be intentional. However, these illustrations are just examples, at it may be the case that a more circular shape, as opposed to an oblong shape, is more indicative of intentional contact.

Another non-limiting example representative of embodiments of the invention involves whether the contact area grows vertically or horizontally. The contact area may grow in only one direction, or may grow both vertically and horizontally but in one direction more than the other. As such, growth in one direction or mostly in one direction may be characteristic of purposeful screen contact. One illustrative example provides that horizontal or mostly horizontal growth may be indicative of inadvertent contact, while vertical or mostly vertical growth may be indicative of intentional contact. However, this illustrations is merely an example, at it may be the case horizontal growth, as opposed to vertical growth, is more indicative of intentional contact.

Embodiments of the invention provide that certain calibration methods may be used to determine resting contact and intentional contact characteristics. A non-limiting illustration of calibration techniques representative of embodiments of the invention involve a user resting his fingers on the on-screen keyboard and pressing certain keys as directed by the calibration method. The calibration method would use the information obtained from the user, such as the surface area and shape of both resting contact and intentional contact, to identify characteristics that differentiate between inadvertent and intentional contact. Embodiments of the invention would utilize the information when determining whether screen contact was inadvertent or purposeful contact.

Embodiments of the invention further provide that learning methods may be used to determine resting contact and intentional contact characteristics. Learning methods according to embodiments of the invention involve monitoring screen contact, including, but not limited to, contact duration, surface area, number of contact points, and time between separate screen contacts. As a non-limiting example illustrative of embodiments of the invention, if there are multiple contact points and not a lot of movement, this may be indicative of resting contact (for example, a user resting their fingers on an on-screen keyboard). As such, the exemplary learning method would use this situation to learn resting contact characteristics. On the other hand, if there is a lot of contact change over time, this may be indicative of intentional contact (for example, a user typing on an on-screen keyboard). Thus, the exemplary learning method would use this scenario to learn intentional contact characteristics.

Embodiments of the invention provide for learning methods that use a timing component, wherein if there is no contact movement within a certain time period (for example, five seconds), then the contact is categorized as resting contact, while contact area change over time is indicative of intentional contact (for example, typing on an on-screen keyboard). Accordingly, embodiments of the invention are configured to learn a user's resting and intentional contact characteristics over time or, alternatively, during a learning phase.

It will be understood by those having ordinary skill in the art that embodiments can be implemented with electronic devices having appropriately configured circuitry, such as a desktop or laptop computer system, and the like. A non-limiting example of a computer system is described below.

The term "circuit" or "circuitry" as used herein includes all levels of available integration, for example, from discrete logic circuits to the highest level of circuit integration such as VLSI, and includes programmable logic components programmed to perform the functions of an embodiment as well as general-purpose or special-purpose processors programmed with instructions to perform those functions.

Figure 3:
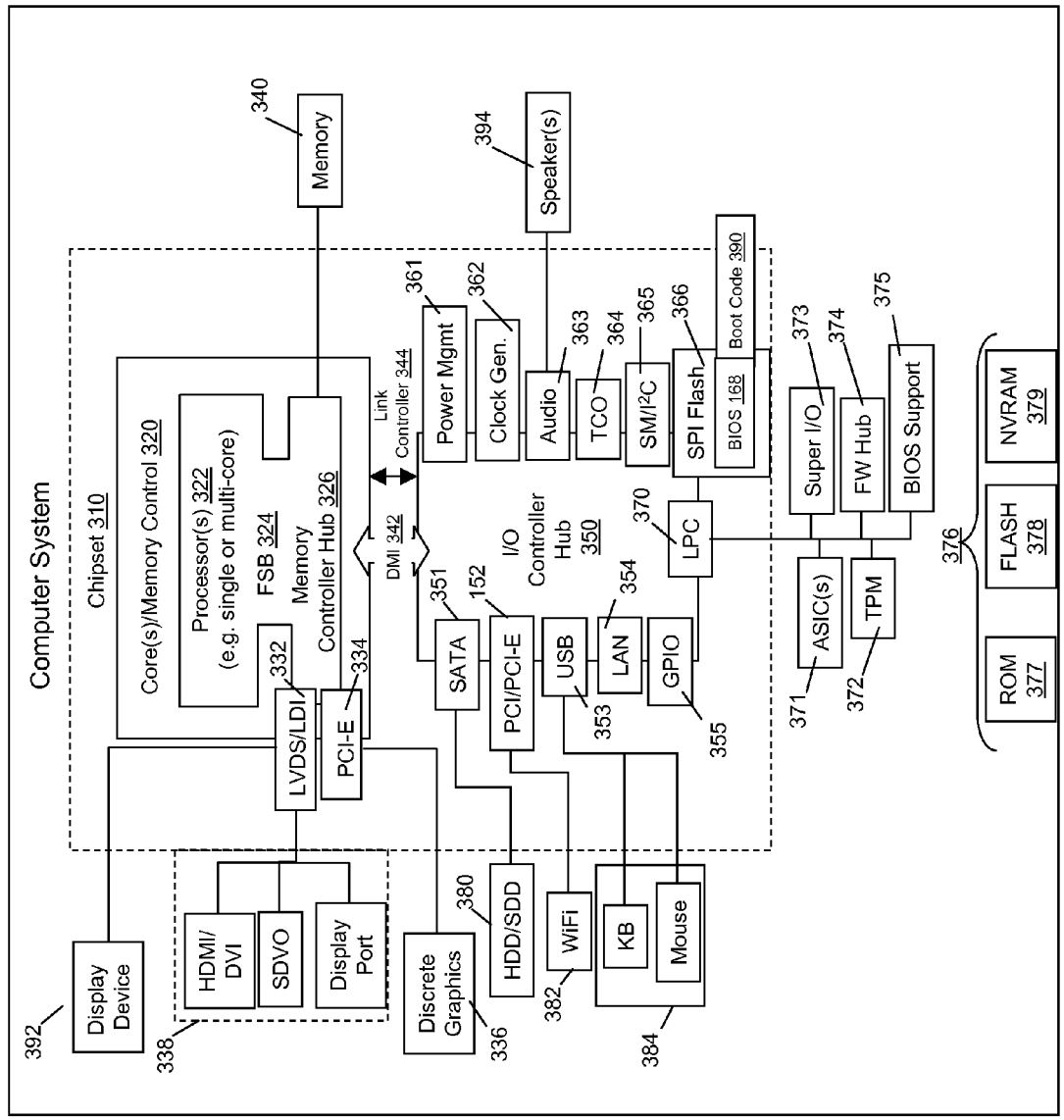
FIG. 3 illustrates an example computer system.

While various other circuits or circuitry may be utilized, FIG. 3 depicts a block diagram of one example of a computer system and circuitry. The system may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system illustrated in FIG. 3.

The computer system of FIG. 3 includes a so-called chipset 310 (a group of integrated circuits, or chips, that work together, chipsets) with an architecture that may vary depending on manufacturer (for example, INTEL®, AMD®, etc.). The architecture of the chipset 310 includes a core and memory control group 320 and an I/O controller hub 350 that exchange information (for example, data, signals, commands, et cetera) via a direct management interface (DMI) 342 or a link controller 344. In FIG. 3, the DMI 342 is a chip-to-chip interface (sometimes referred to as being a link between a "northbridge" and a "southbridge"). The core and memory control group 320 include one or more processors 322 (for example, single or multi-core) and a memory controller hub 326 that exchange information via a front side bus (FSB) 324; noting that components of the group 320 may be integrated in a chip that supplants the conventional "northbridge" style architecture.

In FIG. 3, the memory controller hub 326 interfaces with memory 340 (for example, to provide support for a type of RAM that may be referred to as "system memory"). The memory controller hub 326 further includes a LVDS interface 332 for a display device 392 (for example, a CRT, a flat panel, a projector, et cetera). A block 338 includes some technologies that may be supported via the LVDS interface 332 (for example, serial digital video, HDMI/DVI, display port). The memory controller hub 326 also includes a PCI-express interface (PCI-E) 334 that may support discrete graphics 336.

In FIG. 3, the I/O hub controller 350 includes a SATA interface 351 (for example, for HDDs, SDDs, et cetera), a PCI-E interface 352 (for example, for wireless connections 382), a USB interface 353 (for example, for input devices 384 such as keyboard, mice, cameras, phones, storage, et cetera), a network interface 354 (for example, LAN), a GPIO interface 355, a LPC interface 370 (for ASICs 371, a TPM 372, a super I/O 373, a firmware hub 374, BIOS support 375 as well as various types of memory 376 such as ROM 377, Flash 378, and NVRAM 379), a power management interface 361, a clock generator interface 362, an audio interface 363 (for example, for speakers 394), a TCO interface 164, a system management bus interface 365, and SPI Flash 366, which can include BIOS 368 and boot code 390. The I/O hub controller 350 may include gigabit Ethernet support.

The system, upon power on, may be configured to execute boot code 390 for the BIOS 368, as stored within the SPI Flash 366, and thereafter processes data under the control of one or more operating systems and application software (for example, stored in system memory 340). An operating system may be stored in any of a variety of locations and accessed, for example, according to instructions of the BIOS 368. As described herein, a device may include fewer or more features than shown in the system of FIG. 3.

Furthermore, embodiments may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In this description, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations may be written in any combination of one or more programming languages (including an object oriented programming language such as Java™, Smalltalk, C++ or the like and conventional procedural programming languages, such as the "C" programming language or similar programming languages). The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described herein with reference to flowchart illustrations and/or block diagrams of methods, apparatuses, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor, create means for implementing the functions/acts specified in the flowchart and/or block diagram block or blocks.

These computer program instructions may also be stored in a computer readable medium that can direct a computer or other devices to function in a particular manner, such that the instructions stored in the computer readable medium produce an article of manufacture including instructions which implement the function/act specified in the flowchart and/or block diagram block or blocks.

The computer program instructions may also be loaded onto a computer or other devices to cause a series of operational steps to be performed on the computer or other devices to produce a computer implemented process such that the instructions which execute on the computer or other device provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrative example embodiments have been described herein with reference to the accompanying drawings, it is to be understood that the embodiments are not limited to those precise descriptions, and that various other changes and modifications may be affected therein by one skilled in the art without departing from the scope or spirit of the disclosure.

What is claimed is:

1. An apparatus comprising:
   one or more input devices; and one or more processors;
wherein, responsive to execution of computer readable program code accessible to the one or more processors, the one or more processors;
receive input via the one or more input devices;
ascertain one or more input characteristics of the received input, wherein the one or more input characteristics comprise an input contact area and an input touch direction;
distinguish the input as one of resting contact and input contact based on both: a change in the input contact area and an identification of an input touch direction; and
perform a function associated with the input contact;
wherein the change in the input contact area comprises contact growth in area of an initial input to a value exceeding a threshold that indicates the input is an input contact and wherein the identification of the input touch direction comprises determining that the input touch direction matches a predetermined non-zero input touch direction;
responsive to ascertaining that the value does not exceed the threshold and the input touch direction does not match the predetermined non-zero input touch direction, the input is associated with the resting contact and the input is ignored.

2. The apparatus according to claim 1, wherein the resting contact is ignored and the input contact triggers a response.

3. The apparatus according to claim 1, wherein the one or more input devices comprise a touch screen.

4. The apparatus according to claim 1, wherein the one or more input devices comprise an on-screen keyboard.

5. The apparatus according to claim 1, wherein input is distinguished as input contact if a shape input characteristic matches a predetermined shape value.

6. The apparatus according to claim 1, further comprising identifying one or more resting contact characteristics.

7. The apparatus according to claim 6, wherein the one or more resting contact characteristics are comprised of one or more of the following: area, shape, and the input direction.

8. The apparatus according to claim 7, wherein distinguishing the input as resting contact or input contact comprises comparing the one or more input characteristics with the one or more resting contact characteristics.

9. The apparatus according to claim 7, wherein input is distinguished as resting contact if the area of the input is within a predetermined threshold of the area resting contact characteristic.

10. The apparatus according to claim 7, wherein input is distinguished as input contact if the direction of the input does not match the direction resting contact characteristic.

11. The apparatus of claim 1, wherein:
the initial input comprises finger press input; and
to distinguish the input as one of inadvertent resting contact and intentional input contact based on the one or more input characteristics comprises identifying intentional input contact via detecting growth in the contact area of the finger press input exceeding the threshold and indicative of intentional input contact.

12. A method comprising:
receiving input via one or more input devices;
ascertaining one or more input characteristics of the received input, wherein the one or more input characteristics comprise an input contact area and an input direction;
distinguishing the input as one of resting contact and input contact based on both: a change in the input contact area and an identification of an input touch direction; and
performing a function associated with the input contact;
wherein the change in the input contact area comprises contact growth in area of an initial input to a value exceeding a threshold that indicates o the input is an input contact and wherein the identification of the input touch direction comprises determining that the input touch direction matches a predetermined non-zero input touch direction;
responsive to ascertaining that the value does not exceed the threshold and the input touch direction does not match the predetermined non-zero input touch direction, the input is associated with the resting contact and the input is ignored.

13. The method according to claim 12, wherein resting contact is ignored and input contact triggers a response.

14. The method according to claim 12, wherein the one or more input devices comprise a touch screen.

15. The method according to claim 12, wherein the one or more input devices comprise an on-screen keyboard.

16. The method according to claim 12, further comprising identifying one or more resting contact characteristics.

17. The method according to claim 16, wherein the one or more resting contact characteristics are comprised of one or more of the following: area, shape, and the input touch direction.

18. The method according to claim 17, wherein distinguishing the input as resting contact or input contact comprises comparing the one or more input characteristics with the one or more resting contact characteristics.

19. The method according to claim 17, wherein input is distinguished as input contact if the direction input characteristic does not match the direction resting contact characteristic.

20. A non-signal computer program product comprising:
a computer readable storage device having computer readable program code embodied therewith, the computer readable program code comprising:
computer readable program code configured to receive input via one or more input devices;
computer readable program code configured to ascertain one or more input characteristics of the received input, wherein the one or more input characteristics comprise an input contact area and an input touch direction;
computer readable program code configured to distinguish the input as one of resting contact and input contact based on both: a change in the input contact area and an identification of an input touch direction; and
computer readable program code configured to perform a function associated with the input contact;
wherein the change in the input contact area comprises contact growth in area of an initial input to a value exceeding a threshold that indicates of the input is an input contact and wherein the identification of the input touch direction comprises determining that the input touch direction matches a predetermined non-zero input touch direction;
responsive to ascertaining that the value does not exceed the threshold and the input touch direction does not match the predetermined non-zero input touch direction, the input is associated with the resting contact and the input is ignored.

* * * * *